US008234053B2

(12) United States Patent
Takayanagi et al.

(10) Patent No.: US 8,234,053 B2
(45) Date of Patent: Jul. 31, 2012

(54) FULLY-CLOSED POSITION LEARNING METHOD AND VEHICLE MOTION CONTROL APPARATUS

(75) Inventors: Rika Takayanagi, Saitama (JP); Takayuki Wakai, Saitama (JP); Tadamichi Sakamoto, Saitama (JP); Masaki Shibasaki, Saitama (JP); Masaaki Maeno, Saitama (JP)

(73) Assignees: Bosch Corporation, Tokyo (JP); Nissan Diesel Motor Co., Ltd., Saitama (JP)

( * ) Notice: Subject to any disclaimer, the term of this patent is extended or adjusted under 35 U.S.C. 154(b) by 285 days.

(21) Appl. No.: 12/597,446

(22) PCT Filed: Apr. 21, 2008

(86) PCT No.: PCT/JP2008/057692
§ 371 (c)(1),
(2), (4) Date: Dec. 16, 2009

(87) PCT Pub. No.: WO2008/133236
PCT Pub. Date: Nov. 6, 2008

(65) Prior Publication Data
US 2010/0106391 A1    Apr. 29, 2010

(30) Foreign Application Priority Data
Apr. 23, 2007    (JP) ................. 2007-113199

(51) Int. Cl.
*F02D 41/30* (2006.01)
(52) U.S. Cl. .............. 701/103; 701/107; 123/480
(58) Field of Classification Search .......... 701/103–105, 701/107, 110; 123/399, 436, 479, 480
See application file for complete search history.

(56) References Cited

U.S. PATENT DOCUMENTS

| 6,058,349 | A | 5/2000 | Kikori et al. | |
| 6,574,546 | B2 * | 6/2003 | Nada | 701/110 |
| 7,228,842 | B2 * | 6/2007 | Kato | 123/396 |
| 2009/0164097 | A1 * | 6/2009 | Uda | 701/103 |
| 2009/0265076 | A1 * | 10/2009 | Hirose | 701/103 |

FOREIGN PATENT DOCUMENTS

| JP | 74299 A | 1/1995 |
| JP | 10103090 A | 4/1998 |
| JP | 10176555 A | 6/1998 |
| JP | 2002038978 A | 2/2002 |
| JP | 2006200451 A | 8/2006 |

* cited by examiner

*Primary Examiner* — Hai Huynh
(74) *Attorney, Agent, or Firm* — Ronald E. Greigg

(57) ABSTRACT

According to the invention, erroneous learning of an accelerator pedal fully-closed position is reliably detected, problems originating from the erroneous learning are prevented from arising, and further improvements in reliability of vehicle motion are achieved. A fully-closed position learning process routine for an actual control in which a learning value of a fully-closed position of an accelerator pedal is supplied for actual motion control of a vehicle, and a fully-closed position learning process routine for monitoring used for determining erroneous learning of the learning value of the fully-closed position learning process routine for the actual motion control, are executed, independently, and it is determined that the actual control fully-closed position learning process routine is in an erroneous learning condition in which fuel is injected in an amount exceeding an actually required amount if the learning value in the actual control fully-closed position learning process routine is lower than the learning value in the monitoring fully-closed position learning process routine.

12 Claims, 3 Drawing Sheets

FULLY-CLOSED POSITION LEARNING METHOD AND VEHICLE MOTION CONTROL APPARATUS

BACKGROUND OF THE INVENTION

1. Field of the Invention

The present invention relates to vehicle motion control, and more particularly to vehicle motion control that is intended, for example, to inhibit erroneous learning in a learning process of an accelerator pedal fully-closed position and to improve reliability of vehicle motion.

2. Description of the Related Art

Conventionally, various apparatus have been proposed as this type of apparatus. An example of the apparatus is as follows as disclosed, for example, in JP-A-10-103090. It is provided with what is called a learning function of accelerator pedal opening. It stores output values of a sensor for detecting an opening of an accelerator pedal at the minimum position of the accelerator pedal, in other words, at the condition in which the accelerator pedal is not depressed. When an output value of the sensor is smaller than the most previous stored value by a predetermined constant and also that condition continues for a predetermined time, the output value is set as a new stored value corresponding to the minimum position of the accelerator pedal. Due to the provision of the learning function of accelerator pedal opening, appropriate vehicle motion control can be ensured even when the sensor output value corresponding to the minimum position of the accelerator pedal fluctuates.

However, even the learning function of the accelerator pedal opening such as described above is not perfect. For example, a possibility exists that the learning value may not be updated properly and the erroneous learning condition continues because of, for example, an operation failure or the like of a memory element as hardware in which the learning values are stored. In particular, the above-described conventional learning function does not have the function for whether or not the learning value is one that is learnt erroneously, and therefore, it may cause the following problem. Even when problems arise in fuel injection or the like because of the erroneous learning of the accelerator pedal opening, it is difficult to recognize that the cause of the problem is the erroneous learning of the accelerator pedal opening.

SUMMARY OF THE INVENTION

This invention has been accomplished in view of the foregoing circumstances. This invention provides a fully-closed position learning method, a vehicle motion control method, and a vehicle motion control apparatus, that can reliably detect erroneous learning of an accelerator pedal fully-closed position, can prevent the problems originating from the erroneous learning from arising, and can achieve further improvements in reliability of vehicle motion.

According to a first aspect of the present invention, there is provided a fully-closed position learning method in a vehicle motion control apparatus configured to execute fully-closed position learning process routines for performing learning and updating of a detection value associated with a fully-closed position of an accelerator pedal, the detection value detected by an accelerator pedal sensor, wherein:

two fully-closed position learning process routines are executed independently, one of them being an actual control fully-closed position learning process routine in which a learning value thereof is supplied for actual motion control of a vehicle, and the other one being a monitoring fully-closed position learning process routine for monitoring whether or not the learning value in the actual control fully-closed position learning process routine is appropriate by comparing the learning value in the actual control fully-closed position learning process routine with a learning value thereof; and it is determined that the actual control fully-closed position learning process routine is in an erroneous learning condition in which fuel is injected in an amount exceeding an actually required amount if the learning value in the actual control fully-closed position learning process routine is lower than the learning value in the monitoring fully-closed position learning process routine.

Also, according to a second aspect of the present invention, there is provided a vehicle motion control apparatus configured to execute fully-closed position learning process routines for performing learning and updating of a detection value associated with a fully-closed position of an accelerator pedal, the detection value detected by an accelerator pedal sensor, wherein: two fully-closed position learning process routines are provided so as to be independently executable, one of the two fully-closed position learning process routines being an actual control fully-closed position learning process routine in which a learning value thereof is supplied for actual motion control of a vehicle, and the other one of the fully-closed position learning process routines is a monitoring fully-closed position learning process routine for monitoring whether or not the learning value in the actual control fully-closed position learning process routine is appropriate.

DETAILED DESCRIPTION OF THE PREFERRED EMBODIMENTS

Figure 1:
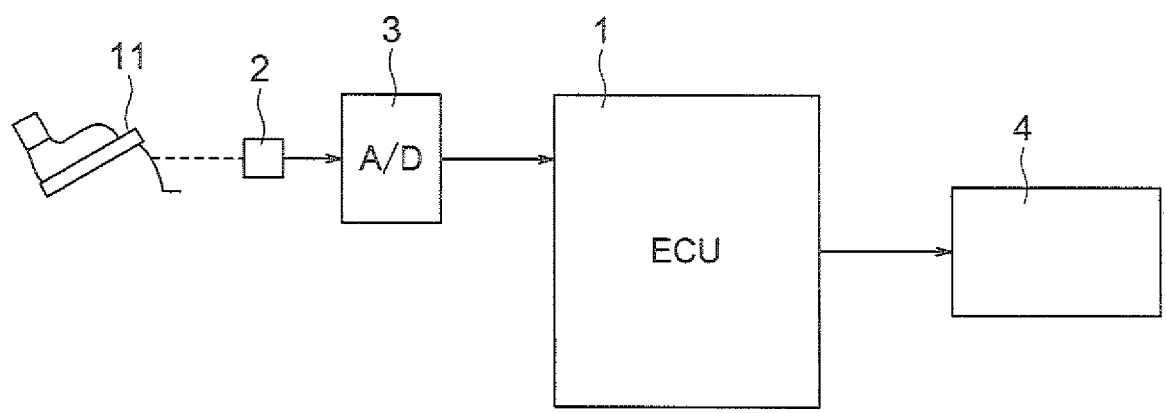
FIG. 1 is a configuration diagram showing an example of the configuration of a vehicle motion control apparatus according to an embodiment of the invention.

Hereinbelow, embodiments of the invention will be described with reference to FIGS. 1 through 3.

It will be noted that the members and arrangements described below are not intended to limit the present invention and can be variously modified within the scope of the gist of the present invention.

First, one example of the configuration of a vehicle motion control apparatus according to an embodiment of the invention will be described with reference to FIG. 1.

This vehicle motion control apparatus includes an electronic control unit 1 (denoted as "ECU" in FIG. 1) as a central component, an opening sensor 2 (accelerator pedal sensor) configured to detect the depressed amount of an accelerator pedal 11 and output an analog signal according to the depressed amount, and an analog-digital converter 3 (denoted as "A/D" in FIG. 1) for analog-digital converting an output signal of the opening sensor 2 and inputting it to the electronic control unit 1.

The opening sensor 2 in the embodiment of the invention is a known sensor configured to output an analog voltage signal according to the depressed amount of the accelerator pedal 11. It is configured as follows. It outputs, as an output voltage Vs, a predetermined voltage Vs0 at the condition in which the accelerator pedal 11 is not depressed, in other words, at the throttle fully closed position. The output voltage Vs rises as the accelerator pedal 11 is depressed from the fully closed position. When the depressed amount of the accelerator pedal 11 is maximum (throttle fully open position), it outputs the maximum value of the output voltage Vs accordingly.

The electronic control unit 1 has, as its main component parts, a microcomputer (not shown) having a publicly known or commonly known configuration as a central component and a memory element (not shown) such as RAM or ROM, and it also has an input interface circuit (not shown) and an output interface circuit (not shown).

The electronic control unit 1 as described above is configured to perform control of the fuel injection operation of a fuel injection system 4 and various control operations necessary for vehicle motion based on detection signals of various sensors, such as the detection values of the above-described opening sensor 2 and the detection values of a rotation sensor, which is not shown in the drawings, for detecting the engine speed and various information related to vehicle motion conditions.

In addition, in the embodiment of this invention, the electronic control unit 1 is configured so as to execute a fully-closed position learning process of the accelerator pedal 11 and also to execute an erroneous learning inhibition process for inhibiting erroneous learning of this learning process, as will be described later.

Figure 2:
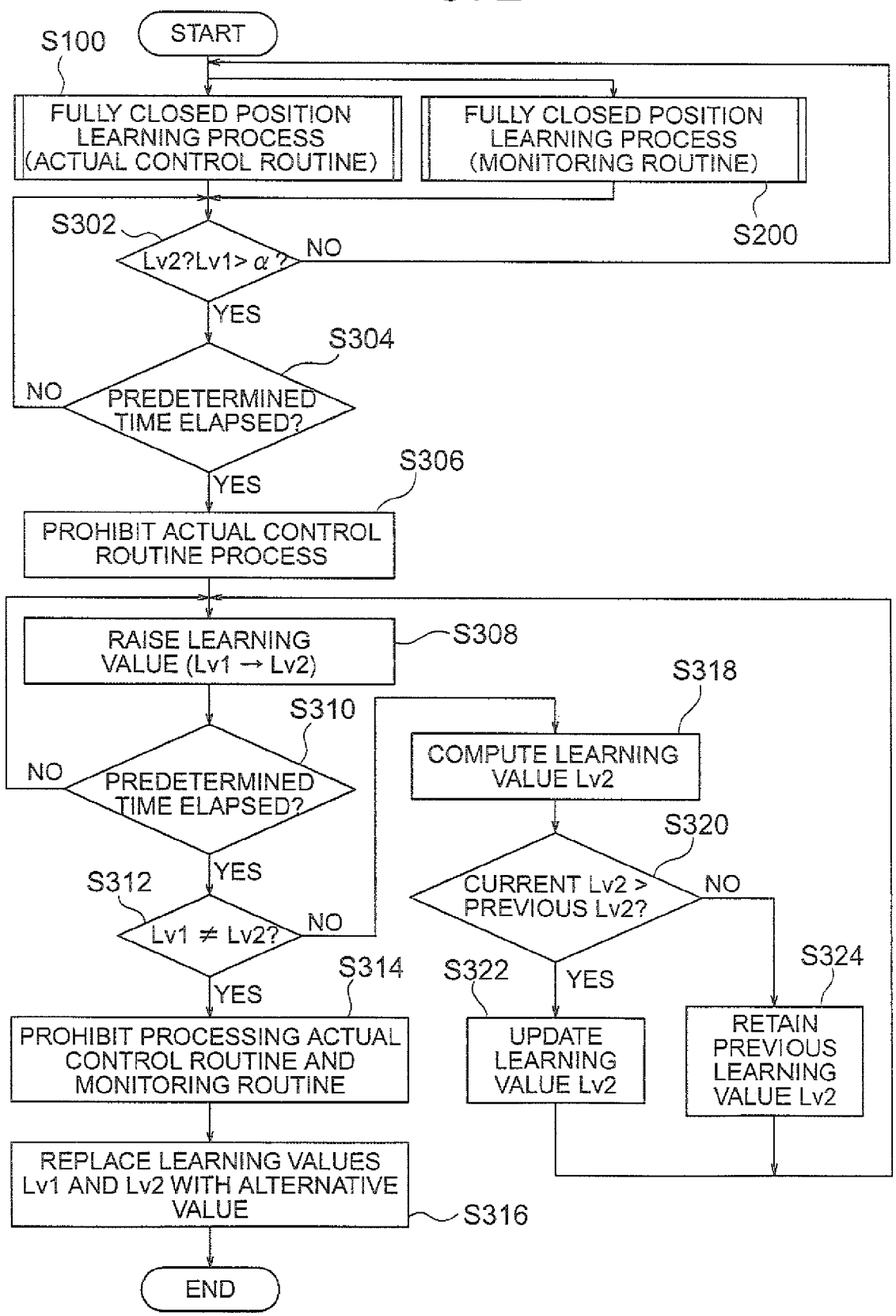
FIG. 2s a flow chart showing the procedure of an erroneous learning inhibition process in an accelerator pedal fully-closed position learning process executed in an electronic control unit that constitutes the vehicle motion control apparatus shown in FIG. 1.

FIG. 2 shows a flow chart illustrating a fully-closed position learning process executed in the electronic control unit 1. Hereinbelow, the details of the process will be described with reference to the figure.

Upon starting the process, the fully-closed position learning process of the accelerator pedal 11 is executed (see steps S100 and S200 in FIG. 2).

Here, the fully closed position of the accelerator pedal 11 referred to the position at which the accelerator pedal 11 is not depressed.

A depressed amount of the accelerator pedal 11 is represented by an output signal of the opening sensor 2. Normally, the minimum output value of the opening sensor 2 is associated with the fully closed position of the accelerator pedal 11 while the maximum output value of the opening sensor 2 is associated with the maximum depressed position of the accelerator pedal 11, so that they are used for vehicle motion control.

When the opening sensor 2 is actually mounted in a vehicle, the minimum output value due to the influence of wiring causes a deviation from that in the case of the opening sensor alone may occur. Even when no such deviation occurs just after the mounting, a deviation may occur later because of aged deterioration of the opening sensor 2 and so forth.

For this reason, if, for example, the minimum output value in the case of the opening sensor 2 alone is stored as the fully closed position of the accelerator pedal 11 in the electronic control unit 1 in advance and is used for vehicle motion control, the correct depressed amount of the accelerator pedal 11 may not be recognized and desired motion control may not be accomplished when such deviation as mentioned above occurs.

In order to avoid such a problem, the electronic control unit 1 is configured to perform a learning process as follows. Under certain conditions, the output value of the opening sensor 2 for the fully closed position of the accelerator pedal 11 is read, and if the read value is different from the output value of the opening sensor 2 for the fully closed position that has been already stored, the newly read value is recognized as the output value of the opening sensor 2 for the fully closed position.

The fully-closed position learning process of the accelerator pedal 11 itself is in accordance with the process procedure that has been performed conventionally. It is sufficiently achieved by such a conventional process procedure, and it does not contain any particular process unique to this invention. However, what is different from the conventional process in the embodiment of this invention is that two channels of fully-closed position learning processes are executed in parallel, specifically, in what is called a time-shared manner actually.

Of the two-channel fully-closed position learning processes, i.e., the two independent fully-closed position learning processes, that are executed in the embodiment of the invention, one is referred to as an actual control routine and the other is referred to as a monitoring routine for convenience. In the actual control routine, the learning value is a normal learning value, which is used for actual vehicle motion control, such as the calculation of a fuel injection amount. On the other hand, the learning value in the monitoring routine serves as a reference for determining whether or not there is erroneous learning in the actual control routine, in other words, a reference for comparison for monitoring purpose, that is, it has the significance as a learning reference value (the details will be described later).

After the actual control routine and the monitoring routine are executed, it is determined that whether or not a deviation between a learning value LV1 of the fully closed position of the accelerator pedal 11 in the actual control routine and a learning value LV2 of the fully closed position of the accelerator pedal 11 in the monitoring routine exceeds a predetermined value $\alpha$ (see step S302 in FIG. 2). It should be noted here that the predetermined value $\alpha$ is determined from the viewpoint that it should be a value suitable for determining that the learning value LV1 of the fully closed position of the accelerator pedal 11 in the actual control routine is abnormal. However, what value is appropriate varies depending on specific conditions such as the running speed of the actual control routine and the monitoring routine and the sensitivity of the opening sensor 2. Therefore, it is preferable that the predetermined value $\alpha$ should be determined based on the results of experiments and simulations under specific conditions such as described above.

If it is determined that the condition $LV2-LV1>\alpha$ is not net in step S302 (if NO), it is desirable that the learning value in the actual control routine is not abnormal, so the actual control routine and the monitoring routine are kept running.

On the other hand, if it is determined that the condition $LV2-LV1>\alpha$ is met in step S302 (if YES), i.e., if it is determined that the learning value in the actual control routine is lower than the learning value in the monitoring routine and also it is determined that the difference therebetween exceeds the predetermined value $\alpha$, it will be determined whether or not a predetermined time has elapsed since the occurrence of such a difference (see step S304 in FIG. 2).

Here, the reason why it is determined whether or not the condition $LV2-LV1>\alpha$ has been underway for a certain time is that such a case where, for example, the condition $LV2-LV1>\alpha$ occurs suddenly at a very low frequency because of noise or the like should not be treated as later-described abnormality in the learning value to ensure operation stability and reliability.

Then, if it is determined that a predetermined time has elapsed in step S304, executing of the actual control routine is forcibly prohibited (see step S306 in FIG. 2).

Here, the significance of detecting a case in which the learning value LV1 in the actual control routine is lower than the learning value LV2 in the monitoring routine and also the difference exceeds a predetermined value α will be described with reference to FIG. 3.

Figure 3:
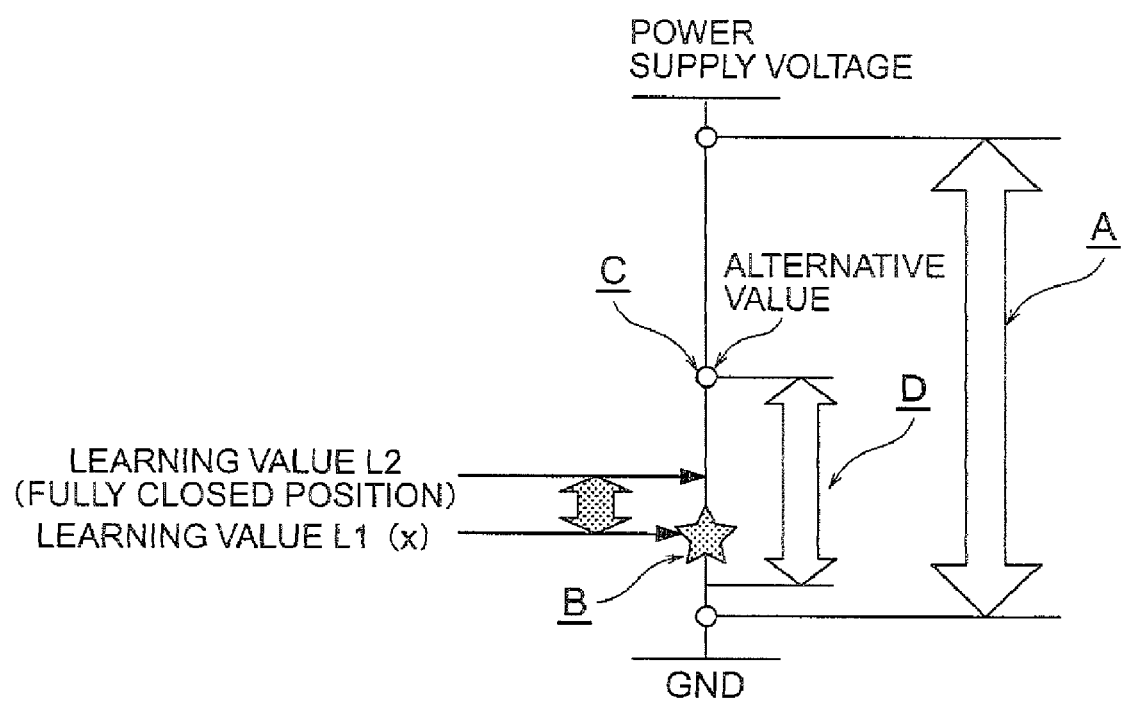
FIG. 3 is a schematic view schematically showing the relationship between output signal levels of an opening sensor and learning values in two fully-closed position learning processes in an embodiment of the invention.

First, in FIG. 3, the arrow denoted by a reference symbol A indicates the variation range of the output signal from the opening sensor 2 alone in the normal operation state in the embodiment of the invention. The minimum output value is higher than the ground potential by a predetermined voltage V1, and the maximum output value, i.e., the output value in the case that the accelerator pedal 11 is at the fully open position, is lower than the power supply voltage (for example, 5 V) by a predetermined voltage V2. The output characteristics of the opening sensor 2 is determined in this way from the viewpoint of, for example, obtaining detection values reliably even when the power supply voltage fluctuates to some degree.

In addition, a permissible range of the learning value, i.e., a learning range, of the fully closed position is defined in both the actual control routine and the monitoring routine. The reason is that it is undesirable to use an extremely greater large value or an extremely smaller value than a normal learning value of the fully closed position, from the viewpoint of ensuring normal vehicle motion and the like.

This learning range is, for example, set as a range represented by the arrow denoted by reference symbol D in FIG. 3. The lower limit value is set at a predetermined value slightly greater than the minimum value in the case of the opening sensor 2 alone (c.f., the arrow denoted by reference symbol A in the same figure), while the upper limit value (the point denoted by reference symbol C in FIG. 3) is set as a predetermined alternative value.

This predetermined alternative value is the same one as the one used in place of the learning values in the actual control routine and the monitoring routine in later-described step S316. In the embodiment of the invention, they are set in the following manner when starting the actual control routine and the monitoring routine upon starting a vehicle.

Specifically, when the ignition switch, which is not shown in the drawings, is turned on, an alternative value stored in advance in a predetermined memory region of the electronic control unit 1 is initially set as the maximum value of the learning range prior to the learning of the fully closed position.

Thus, since the learning range is set in this way, the learning value is restricted to the upper limit or lower limit of the learning range when a detection value of the opening sensor 2 acquired as the learning value of the fully closed position exceeds the upper limit or lower limit of the learning range.

Under this condition, with respect to the learning value LV2 of the fully closed position of the accelerator pedal 11 by the monitoring routine, the learning value LV1 of the fully closed position in the actual control routine is lower than the learning value LV2 in the monitoring routine for some reason (see the point B in FIG. 3). Then, if the learning value LV1 is used for vehicle motion control assuming that the learning value LV2 in the monitoring routine is properly associated with the fully closed position of the accelerator pedal 11, the electronic control unit 1 is brought into a state equivalent to a state in which the accelerator pedal 11 has already been depressed to a certain degree although it is in fact at the real fully closed position of the accelerator pedal 11. As a consequence, unnecessary fuel injection is performed although fuel injection should not be performed. This is undesirable from the viewpoint of, for example, ensuring safety in vehicle motion.

The embodiment of the invention takes such a circumstance in consideration, and it ensures safety in vehicle motion by detecting a case in which the learning value LV1 in the actual control routine is lower than the learning value LV2 in the monitoring routine and also the difference exceeds a predetermined value α.

Referring back to FIG. 2, after the process of step S306, the learning value LV1 of the fully closed position of the accelerator pedal 11 in the actual control routine is replaced with the learning value in the monitoring routine LV2 forcibly, whereby the learning value is raised (see step S308 in FIG. 2).

It should be noted that the raise of the learning value is not limited to the case where it is performed immediately. It may be raised gradually in a stepwise manner, or it may be raised gradually continuously.

Then, if it is determined that a predetermined time has elapsed since the start of raising the learning value (if YES), the operation proceeds to step S312 (see step S310 in FIG. 2). It should be noted that the predetermined time here is a different one from the predetermined time in step S304.

In step S312, it is determined whether or not the learning value LV1 in the actual control routine and the learning value LV2 in the monitoring routine do not match (LV1≠LV2).

Here, the occurrence of such an event that a semiconductor memory element itself for storing the learning value LV1, such as a RAM, does not operate properly for some reason so the stored data cannot be overwritten, and a failure of the hardware peripheral to the semiconductor memory element, are conceivable as examples of the cause of LV1≠LV2 despite having performed the raise of the learning value (see step S308 in FIG. 2).

In step S312, if it is determined that the condition LV1≠LV2 is not met (if NO), it is judged that the raise of the learning value LV1 in the actual control routine to the learning value LV2 in the monitoring routine is performed properly, so the operation proceeds to the process of later-described step S318.

On the other hand, if it is determined in step S312 that LV1≠LV2, i.e., that the learning value LV1 in the actual control routine and the learning value LV2 in the monitoring routine do not match (if YES), it is judged that the apparatus is in some kind of faulty condition as described above, so the operation proceeds to the process of step S314, which will be described next.

In step S314, process execution of the actual control routine and the monitoring routine is prohibited forcibly. Next, the learning value LV1 in the actual control routine and the learning value LV2 in the monitoring routine are changed to predetermined alternative values forcibly, and a series of processes is finished (see step S316 FIG. 2). It should be noted that it is preferable to store the alternative values in a separate memory element to read out the stored values to use in this step 316, taking into consideration that the raise of the learning values may not be performed because of a failure of the semiconductor memory element for storing the learning values LV1 and LV2 as described above.

Meanwhile, in step S318, the monitoring routine is executed to compute a learning value LV2 at the present time point.

Next, it is determined whether or not the current learning value LV2 is greater than the previous, i.e., the immediately preceding learning value LV2 (see step S320 in FIG. 2). If it is determined that the current learning value LV2 is greater than the previous learning value LV2 (if YES), the operation proceeds to the process of step S322, which will be described next. On the other hand, if it is determined that the current learning value LV2 is not greater than the previous learning value LV2 (if NO), the operation proceeds to the process of later-described step S324.

In step S322, the learning value LV2 is updated to the learning value LV2 that is obtained in step S318, and the operation returns to the process of the previous step S308.

On the other hand, in step S324, the previous learning value LV2 is retained, and the operation returns to the process of the previous step S308.

Thus, the learning value is updated only when the latest learning value LV2 is greater than the immediately preceding learning value. The reason is that an event such that safety in vehicle motion may be hindered is unlikely to occur in that case, as described previously referring to FIG. 3.

As described above, the fully closed position learning method according to the invention detects erroneous learning of the fully closed position of the accelerator pedal reliably and inhibits the occurrence of the problems originating from the erroneous learning. Therefore, it is suitable for a vehicle motion control apparatus that has a learning function of the accelerator pedal.

According to the invention, the actual control fully-closed position learning process routine and the monitoring fully-closed position learning process routine are executed in parallel so that the occurrence of erroneous learning in the actual control fully-closed position learning process routine can be determined taking the learning value in the monitoring fully-closed position learning process routine as the reference. Therefore, erroneous learning of the fully closed position can be identified reliably, unlike the conventional case. Moreover, if it is determined that erroneous learning occurs, the learning value is shifted in a direction in which the accelerator pedal opening recognized by the detection value of the accelerator pedal sensor becomes smaller. Therefore, unlike the conventional case, it becomes possible to reliably avoid the problem in which the detection value of the accelerator pedal sensor is recognized to be at a position where the accelerator pedal is depressed further than the fully closed position even though the accelerator pedal is at the fully closed position and as a consequence unnecessary fuel injection is performed. As a result, highly reliable vehicle motion can be ensured.

Furthermore, if it is determined that erroneous learning has occurred in the actual control fully-closed position learning process routine, execution of the process routine is prohibited; therefore, safety can be ensured reliably.

What is claimed is:

1. A fully-closed position learning method in a vehicle motion control apparatus configured to execute fully-closed position learning process routines for performing learning and updating of a detection value associated with a fully-closed position of an accelerator pedal, the detection value defected by an accelerator pedal sensor, the method characterized in that:

two fully-closed position learning process routines are executed independently, one of them being an actual control fully-closed position learning process routine in which a learning value of the actual control fully-closed position learning process routine is supplied for actual motion control of a vehicle, and the other one being a monitoring fully-closed position learning process routine for monitoring whether or not the learning value in the actual control fully-closed position learning process routine is appropriate by comparing the learning value in the actual control fully-closed position learning process routine with a learning value of the monitoring fully-closed position learning process routine; and it is determined that the actual control fully-closed position learning process routine is in an erroneous learning condition in which fuel is injected in an amount exceeding an actually required amount if the learning value in the actual control fully-closed position learning process routine is lower than the learning value in the monitoring fully-closed position learning process routine.

2. The fully-closed position learning method as set forth in claim 1, wherein if the learning value in the actual control fully-closed position learning process routine is lower than the learning value in the monitoring fully-closed position learning process routine and a deviation therebetween exceeds a predetermined value, execution of the actual control fully-closed position learning process routine is prohibited and the learning value in the actual control fully-closed position learning process routine is converged to the learning value in the monitoring fully-closed position learning process routine.

3. The fully-closed position learning method as set forth in claim 2, wherein if the convergence of the learning value in the actual control fully-dosed position learning process routine to the learning value in the monitoring fully-closed position learning process routine is not completed within a predetermined time, it is determined that some abnormality occurs in hardware, so that execution of both the actual control fully-closed position learning process routine and the monitoring fully-closed position learning process routine is prohibited, and a predetermined alternative value is supplied for vehicle motion control in place of the learning value.

4. The fully-closed position learning method as set forth in claim 3, wherein if the convergence of the learning value in the actual control fully-closed position learning process routine to the learning value in the monitoring fully-closed position learning process routine is completed within a predetermined time, the learning value in the monitoring fully-closed position learning process routine is supplied for vehicle motion control thereafter, and the learning value is updated only if the learning value in the monitoring fully-closed position learning process routine is greater than the immediately preceding learning value.

5. A vehicle motion control apparatus configured to execute fully-closed position learning process routines for performing learning and updating of a detection value associated with a fully-closed position of an accelerator pedal, the detection value detected by an accelerator pedal sensor, wherein two fully-closed position learning process routines are provided so as to be independently executable, one of the two fully-closed position learning process routines being an actual control fully-closed position learning process routine in which a learning value of the actual control fully-closed position learning process routine is supplied for actual motion control of a vehicle, and the other one of the fully-closed position learning process routines is a monitoring fully-closed position learning process routine for monitoring whether or not the learning value in the actual control fully-closed position learning process routine is appropriate.

6. The vehicle motion control apparatus as set forth in claim 5, wherein if the learning value in the actual control fully-closed position learning process routine is lower than the learning value in the monitoring fully-closed position learning process routine, the actual control fully-closed position learning process routine is in an erroneous learning condition in which fuel can be injected in an amount exceeding an actually required amount.

7. The vehicle motion control apparatus as set forth in claim 6, wherein if the learning value in the actual control fully-closed position learning process routine is lower than the learning value in the monitoring fully-closed position learning process routine and a deviation therebetween exceeds a predetermined value, execution of the actual control fully-closed position learning process is prohibited and the learning value in the actual control fully-closed position learning process routine is converged to the learning value in the monitoring fully-closed position learning process routine.

8. The vehicle motion control apparatus as set forth in claim 7, wherein if the convergence of the learning value in the actual control fully-closed position learning process routine to the learning value in the monitoring fully-closed position learning process routine is not completed within a predetermined time, it is determined that some abnormality occurs in hardware, so that execution of both the actual control fully-closed position learning process routine and the monitoring fully-closed position learning process routine is prohibited, and a predetermined alternative value is supplied for vehicle motion control in place of the learning value.

9. The vehicle motion control apparatus as set forth in claim 8, wherein if the convergence of the learning value in the actual control fully-closed position learning process routine to the learning value in the monitoring fully-closed position learning process routine is completed within a predetermined time, the learning value in the monitoring fully-closed position learning process routine is supplied for vehicle motion control thereafter, and the learning value is updated only if the learning value in the monitoring fully-closed position learning process routine is greater than the immediately preceding learning value.

10. A fully-closed position learning program executed in a vehicle motion control apparatus configured to execute fully-closed position learning process routines for performing learning and updating a detection value associated with a fully-closed position of an accelerator pedal, the detection value detected by an accelerator pedal sensor, comprising:
   a step of executing the fully-closed position learning process routine as an actual control fully-closed position learning process routine in which a learning value of the actual control fully-closed position learning process routine is supplied for actual motion control of a vehicle;
   a step of executing another fully-closed position learning process routine separately from the actual control fully-closed position learning process routine, as a monitoring fully-closed position learning process routine for monitoring whether or not the learning value in the actual control fully-closed position learning process routine is appropriate by comparing the learning value in the actual control fully-closed position learning process routine with a learning value of the monitoring fully-closed position learning process routine;
   a step of determining whether or not the learning value in the actual control fully-closed position learning process routine is lower than the learning value of the monitoring fully-closed position learning process routine;
   a step of prohibiting execution of the actual control fully-closed position learning process routine if it is determined that the learning value in the actual control fully-closed position learning process routine is lower than the learning value in the monitoring fully-closed position learning process routine; and
   a step of converging the learning value in the actual control fully-closed position learning process routine to the learning value the monitoring fully-closed position learning process routine, in association with the prohibiting of execution of the actual control fully-closed position learning process routine.

11. The fully-closed position learning program as set forth in claim 10, further comprising:
   a step of determining whether or not the convergence of the learning value in the actual control fully-closed position learning process routine to the learning value of the monitoring fully-closed position learning process routine is completed within a predetermined time;
   a step of determining that some abnormality occurs in hardware and prohibiting execution of both the actual control fully-closed position learning process routine and the monitoring fully-closed position learning process routine, if it is determined that the convergence of the learning value in the actual control fully-closed position learning process routine to the learning value in the monitoring fully-closed position learning process routine is not completed within a predetermined time; and
   a step of supplying a predetermined alternative value for vehicle motion control in place of the learning value, in association with the prohibiting of execution of the actual control fully-closed position learning process routine and the monitoring fully-closed position learning process routine.

12. The fully-closed position learning program as set forth in claim 11, further comprising:
   a step of supplying, if it is determined that the convergence of the learning value in the actual control fully-closed position learning process routine to the learning value in the monitoring fully-closed position learning process routine is completed within a predetermined time, the learning value in the monitoring fully-closed position learning process routine is supplied for vehicle motion control thereafter; and
   a step of updating the learning value in the monitoring fully-closed position learning process routine after it is determined that the convergence of the learning value in the actual control fully-closed position learning process routine to the learning value in the monitoring fully-closed position learning process routine is completed within a predetermined time and only if the learning value in the monitoring fully-closed position learning process routine is greater than the immediately preceding learning value.

* * * * *